Feb. 23, 1960

H. L. HARTMAN 2,925,737

PLURAL-SPEED PHONOGRAPH TURNTABLE DRIVE MECHANISMS

Filed Feb. 21, 1957

INVENTOR.
HERBERT L. HARTMAN
BY
ATTORNEYS.

Feb. 23, 1960

H. L. HARTMAN 2,925,737

PLURAL-SPEED PHONOGRAPH TURNTABLE DRIVE MECHANISMS

Filed Feb. 21, 1957

INVENTOR.
HERBERT L. HARTMAN
BY
ATTORNEYS.

Feb. 23, 1960  H. L. HARTMAN  2,925,737
PLURAL-SPEED PHONOGRAPH TURNTABLE DRIVE MECHANISMS
Filed Feb. 21, 1957  4 Sheets-Sheet 3

INVENTOR.
HERBERT L. HARTMAN
BY Stough and Stough
ATTORNEYS.

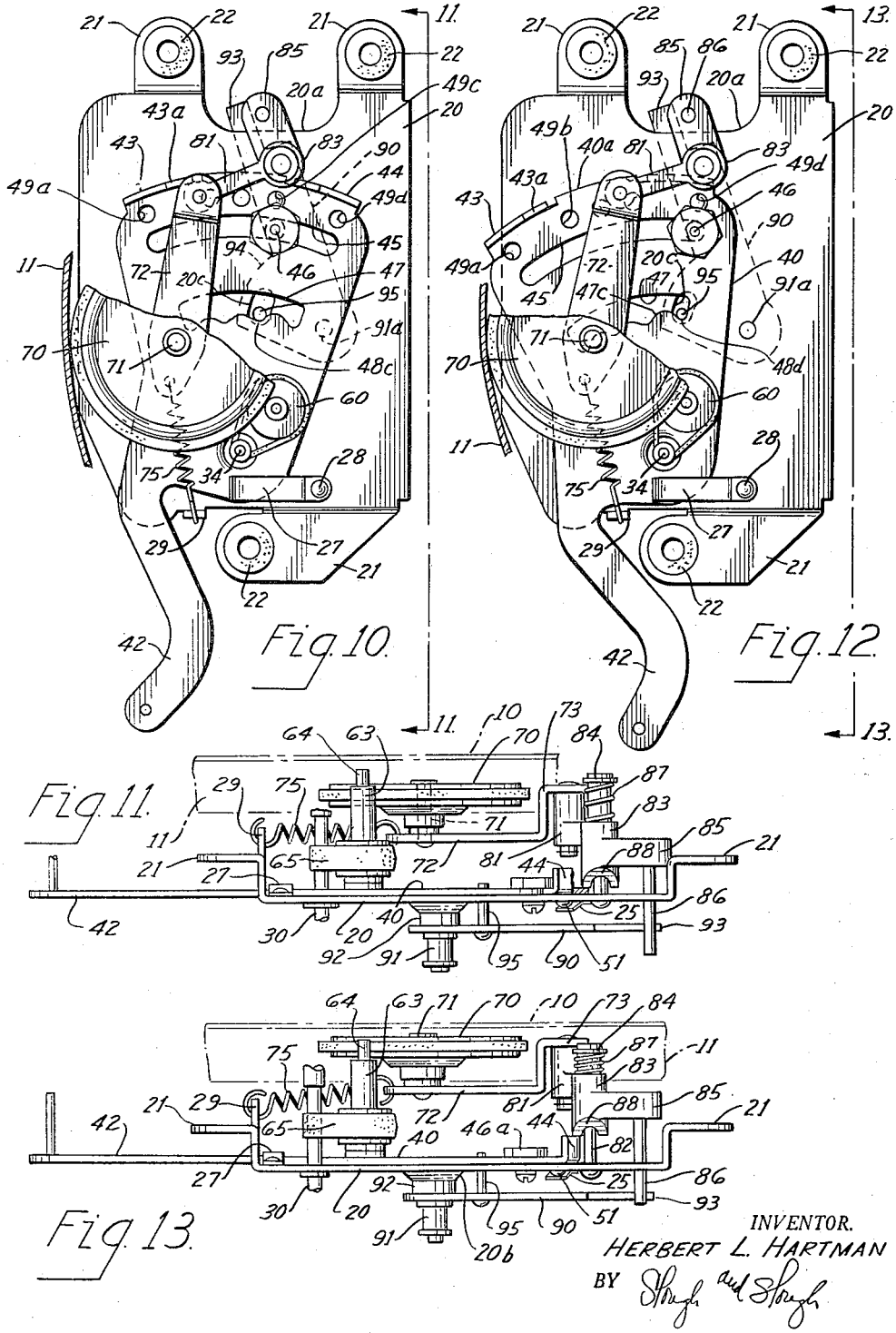

United States Patent Office 2,925,737
Patented Feb. 23, 1960

2,925,737

PLURAL-SPEED PHONOGRAPH TURNTABLE DRIVE MECHANISMS

Herbert L. Hartman, Elyria, Ohio, assignor to The General Industries Company, Elyria, Ohio, a corporation of Ohio Application February 21, 1957, Serial No. 641,641

8 Claims. (Cl. 74—199)

My invention relates to multiple speed phonograph turntable driving mechanisms and particularly to a driving mechanism whereby a turntable having a circumferentially continuous depending flange is adapted to be rotated at any one of a plurality of predetermined rotational speeds by means of an idler pulley frictionally contacting an inner peripheral surface of said depending flange, said idler wheel being frictionally driven by one of a plurality of interchangeable driving pulley portions of different diameters.

In the form shown, my invention discloses a plural-speed turntable driving mechanism of the above type which is adapted to rotate a turntable at successively selective speeds of 45 r.p.m., 78 r.p.m., 33⅓ r.p.m., and 16⅔ r.p.m., it being understood that the recited speeds are used as examples only and that my turntable driving mechanism can be readily adapted to drive said turntable at any desirable speed.

My invention comprises a motor driven rotor shaft and a driving pulley driven by said rotor shaft, and said rotor shaft and said driving pulley each having preferably non-resilient driving portions adapted to drive the phonograph turntable at different speeds. An idler pulley is preferably provided with a resilient peripheral surface and is adapted to frictionally and successively contact the said different driving portions of the rotor shaft and the driving pulley and, in each operative position, to frictionally contact the inner peripheral surface of the turntable flange to drive the turntable at a selected speed.

It is, therefore, an object of my invention to provide an improved turntable driving mechanism of the type referred to which can be operatively adjusted to rotate a turntable at any one of a plurality of predetermined speeds.

Another object of my invention is to provide an improved mechanism for selecting and maintaining the speeds at which the turntable is to be rotated.

A further object of my invention is to provide a novel and efficient mechanism for shifting the idler wheel into and out of engagement with driving pulley portions which are disposed at different vertical levels.

Another object of my invention is to provide an improved turntable driving mechanism which is simple and inexpensive to manufacture and is highly efficient in use.

Other objects of my invention and the invention itself will be readily apparent from a study of the accompanying description and the appended drawings, in which drawings:

Fig. 10 is a top plan view of the turntable driving mechanism shown in an adjusted position for driving a turntable at 33⅓ r.p.m.;

Fig. 11 is an elevational view taken along the line 11—11 of Fig. 10;

Fig. 12 is a top plan view of the turntable driving mechanism shown in an adjusted position for driving a turntable at 16⅔ r.p.m.; and Fig. 13 is an elevational view taken along the line 13—13 of Fig. 12.

Figure 1:
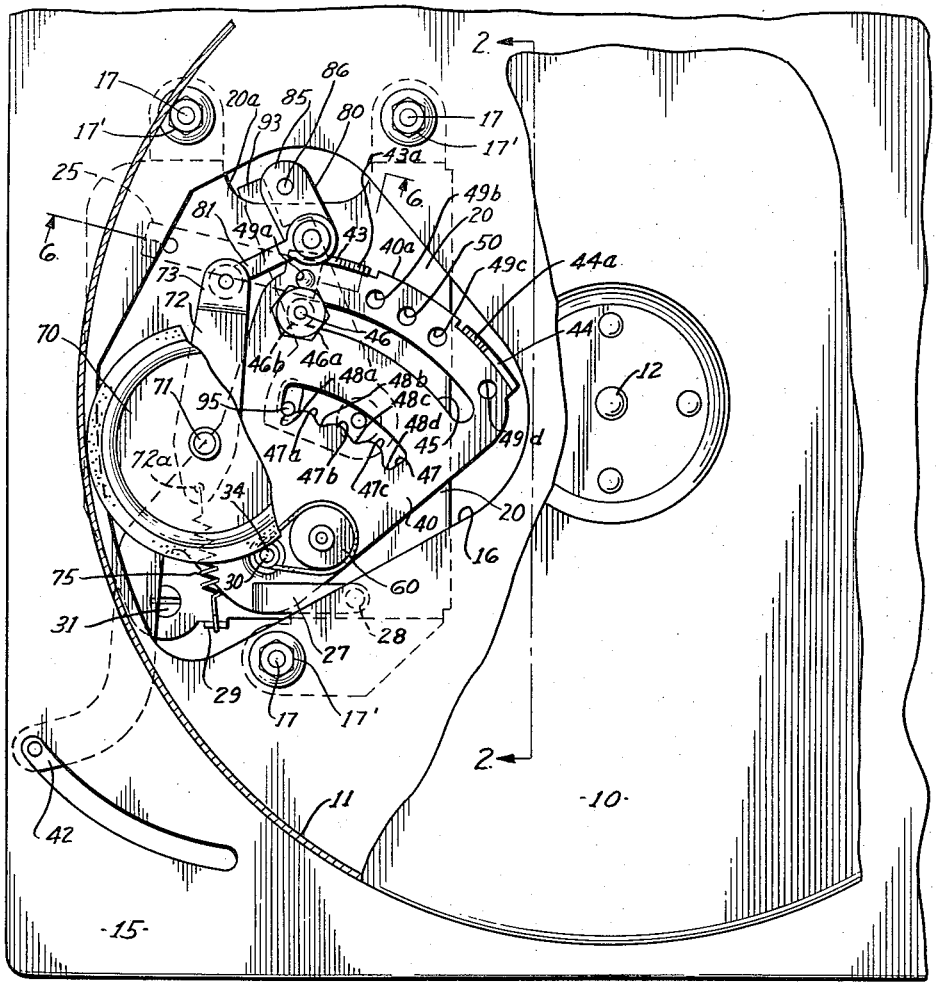
Fig. 1 is a top plan view of the four-speed phonograph turntable driving mechanism of my invention as it is mounted in a phonograph, said driving mechanism being in an adjusted position for driving a turntable at 45 r.p.m.

Referring now more specifically to the figures of drawings and particularly to Fig. 1, at 10 I show a conventional phonograph turntable having a circumferentially continuous depending flange 11, said turntable being rotatably mounted in a well-known manner upon a spindle 12 of a mounting plate 15 of a phonograph. Radially outwardly from the spindle 12, the mounting plate 15 is provided with an irregularly shaped enlarged opening 16 beneath which is positioned a subplate 20.

Figure 2:
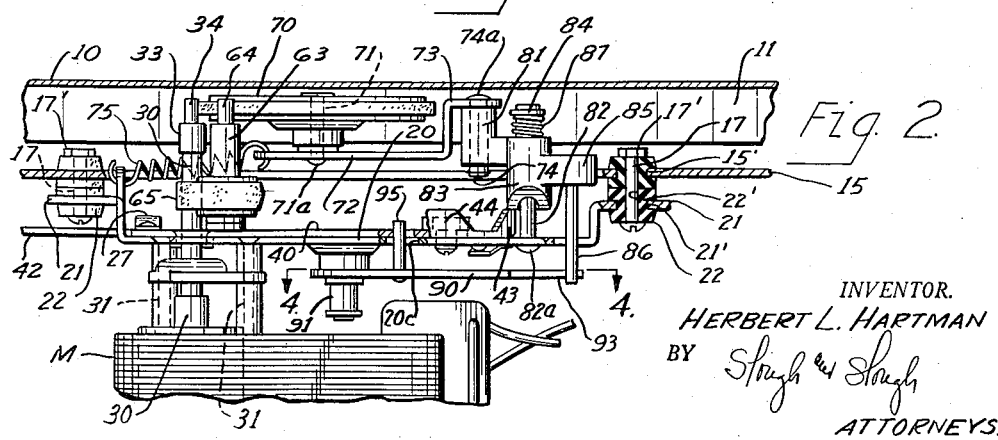
Fig. 2 is an elevational view of the turntable driving mechanism of Fig. 1 taken along the line 2—2 of Fig. 1.

In the form shown, the subplate 20 is spaced downwardly away from the mounting plate 15 (Fig. 2) and is pendently supported by the mounting plate 15 by means of three upwardly stepped horizontally outwardly projecting lugs 21 of said subplate. Interposed between the lugs 21 and the mounting plate 15 are grommets 22, said grommets being formed of rubber or similar resilient material and serving as a cushioning and a sound-absorbing suspension for the subplate 20. Bolts 17 project vertically through suitably aligned apertures 21' in the lugs 21, apertures 22' in the grommets 22, and apertures 15' in the mounting plate 15 and are provided with nuts 17' on upwardly projecting threaded ends thereof.

Figures 3, 4, 5, 6:
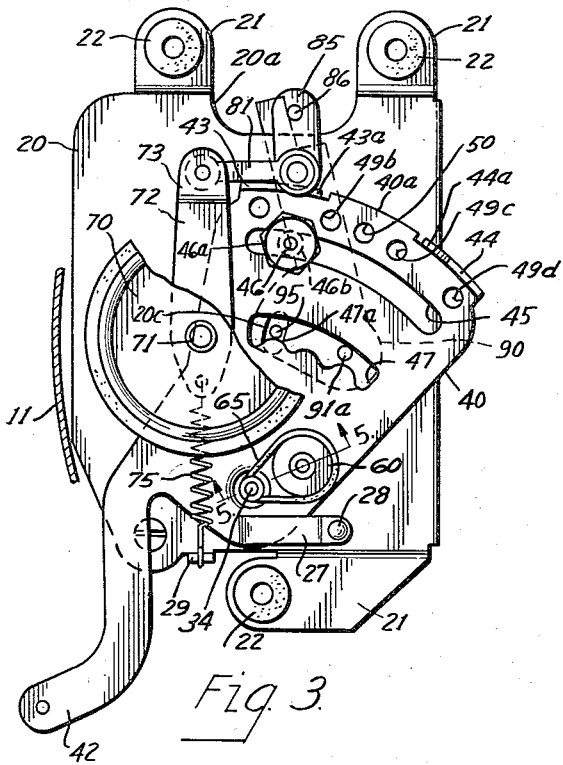
Fig. 3 is a top plan view of the turntable driving mechanism shown in an intermediate position between two driving positions.
Fig. 4 is a sectional detail of a drive release lever taken along the line 4—4 of Fig. 2.
Fig. 5 is a sectional view taken along the line 5—5 of Fig. 3.
Fig. 6 is a sectional view taken along the line 6—6 of Fig. 1.

The subplate 20 is positioned under the turntable 10 adjacent the periphery thereof and provides supporting means for the plural-speed phonograph turntable driving mechanism of my invention, said mechanism being mounted upon the upper surface of said subplate as hereinafter more fully described and having parts projecting upwardly through the opening 16 in the mounting plate 15. Beneath the subplate 20, an electric motor M is pendently attached in any suitable manner, such as by bolts 31, said motor having a rotor shaft 30 projecting vertically upwardly through an aperture 23 in said subplate (Fig. 5).

The plural-speed phonograph turntable driving mechanism of my invention comprises a speed shift lever 40 pivotally mounted upon the subplate 20 by means of a circumferentially continuous, depending pivot flange 41 of such dimension as to interfit the aperture 23 of said subplate, the rotor shaft 30 protruding upwardly through the opening 41' of the lever surrounded by said pivot flange and being radially spaced away from the inner periphery thereof. The said shift lever 40 extends radially outwardly in a horizontal plane, the radially outer edge 40a of said shift lever being in the form shown arcuately formed relative to the vertical axis of the pivot flange 41, and said shift lever provided with a generally oppositely directed handle 42 which extends outwardly beyond the depending flange 11 of the turntable 10. It is obvious that any preferred operator actuator means could be associated with said shift lever, such as link means, etc.

The said arcuate edge 40a of the shift lever 40 has two vertically upwardly directed cam portions 43 and 44 disposed at either end of said edge, said cam portions being substantially interspaced and having upwardly angled camming surfaces 43a and 44a respectively which are angled upwardly in opposite directions from the medial portion of the arcuate edge 40a.

The shift lever 40 is provided with an arcuate slot 45, said slot being spaced radially inwardly from the arcuate edge 40a and being radially equidistant at all portions thereof from the center of the pivot flange 41. A bolt 46 mounted on the subplate 20 projects vertically upwardly from the said subplate 20 through the slot 45 of the shift lever 40, said bolt having a nut 46a on the upwardly directed end thereof. A spacer 46b is telescoped over the bolt 46 and interposed between the nut 46a and the subplate 20. The spacer 46b is so diametrically dimensioned as to slidably interfit the arcuate slot 45 and is of such vertical dimension as to space the nut 46a away from the uppermost surface of the shift lever 40 whereby said shift lever is freely movable relative to the pivot flange 41.

A second arcuate slot 47 in the shift lever 40 is spaced radially inwardly a substantial distance from the arcuate slot 45, said arcuate slot 47 being of such longitudinal dimension that the extreme ends thereof are substantially aligned with the ends of the arcuate slot 45 relative to the center of the pivot flange 41.

The radially innermost edge of the arcuate slot 47 is irregularly shaped to form three radially outwardly projecting, convexly rounded, evenly spaced camming surfaces 47a, 47b and 47c, said outwardly projecting camming surfaces providing complementary interspaced, concavely rounded notches 48a, 48b, 48c and 48d. The notch 48a is disposed in the most counter-clockwise directed end of the slot 47 adjacent the camming surface 47a; the notch 48b is interposed between the camming surfaces 47a and 47b; the notch 48c is interposed between the camming surfaces 47b and 47c, and the notch 48d is disposed in the clockwise directed end of said arcuate slot 47 adjacent the camming surface 47c.

The shift lever 40 is further provided with a series of interspaced circular indexing apertures 49a, 49b, 50, 49c and 49d, said indexing apertures being arcuately aligned, radially equidistant from the center of the pivot flange 41, and radially interposed between the arcuate slot 45 and the arcuate outer edge 40a of said shift lever. The indexing apertures 49a, 49b, 49c, and 49d are radially outwardly aligned with the notches 48a, 48b, 48c and 48d respectively of the arcuate slot 47, and the indexing aperture 50 is radially outwardly aligned with the apex of the camming surface 47b and intermediately positioned between the indexing apertures 49b and 49c.

The indexing apertures 49a, 49b, 50, 49c and 49d are adapted to frictionally engage a spherical detent ball 51 (Fig. 6) which projects upwardly through a circular perforation 24 in the subplate 20 and said perforation being diametrically larger than said detent ball and said detent ball being diametrically larger than said indexing apertures. The detent ball 51 is vertically upwardly biased by means of a flat spring 25, one end of said flat spring being preferably riveted to the lowermost surface of the subplate 20 by a rivet 26 and the free end of said flat spring exerting an upwardly resilient pressure upon said detent ball. When the shift lever 40 is pivotally moved about the pivot flange 41, the detent ball 51 successively snaps into and out of frictional engagement with the indexing apertures 49a, 49b, 50, 49c and 49d.

The pivot flange 41 of the shift lever 40 is resiliently maintained within the aperture 23 of the subplate 20 by means of a second flat spring 27 preferably riveted to the uppermost surface of said subplate by means of a rivet 28, the free end of said flat spring projecting over the shift lever 40 adjacent the pivot flange 41 and exerting a downwardly resilient pressure thereupon.

Referring now to Fig. 5, the shift lever 40 has mounted thereupon a drive pulley 60, said drive pulley being positioned relatively near the pivot flange 41 and the rotor shaft 30. The drive pulley 60 is rotatably mounted upon a vertically upstanding stud 61 riveted or otherwise rigidly secured to the shift lever 40 at 61a. The drive pulley 60 is centrally bored at 60a to telescopically interfit the stud 61, said drive pulley being frictionally maintained upon said stud by means of a radially outwardly expansive wire spring 61b positioned within a circumferential groove 61c of said stud.

The drive pulley 60 is upwardly diametrically stepped to form a lowermost, crowned, belt-driven pulley portion 62 of largest diameter, a diametrically smaller intermediate driving portion 63 above said crowned portion, and a still smaller, uppermost driving portion 64. A pulley driving belt 65, preferably manufactured of rubber or a like resilient material, connects the rotor shaft 30 with the crowned pulley portion 62 of the drive pulley 60 whereby the rotational movement of said rotor shaft transmits a rotational movement to said drive pulley, the number of revolutions per minute of said drive pulley being substantially less than the corresponding revolutions of said rotor shaft due to the relatively greater diameter of said crowned pulley portion to that of said rotor shaft.

In Fig. 5, it will also be noted that the rotor shaft 30 has two diametrically stepped pulley portions, an uppermost, relatively smaller pulley portion 34 and a relatively larger pulley portion 33 below said upper pulley portion. It will be further noted that the upper pulley portion 34 of the rotor shaft 30 is in a horizontal plane with the upper pulley portion 64 of the drive pulley 60, and the relatively lower pulley portion 33 of said rotor shaft is in a plane with a substantial part of the intermediate pulley portion 63 of said drive pulley.

The rotational movement of the rotor shaft 30 and the drive pulley 60 is transmitted to the inner peripheral surface of the depending flange 11 of the turntable 10 by means of an idler pulley 70. As best shown in Figs. 2, 8, 11 and 13, the idler pulley 70 is rotatably mounted upon a vertically upstanding stud 71 of an idler mounting lever 72.

The idler mounting lever 72 is preferably formed of flat sheet metal and has, at one end thereof, an upwardly stepped horizontally disposed pivot portion 73, and at the opposite end thereof, said mounting lever is provided with an aperture 72a. The upstanding stud 71 is secured to the mounting lever 72 adjacent the end having the aperture 72a therein and is riveted or otherwise suitably secured to said mounting lever at 71a.

The pivot portion 73 of the mounting lever 72 is pivotally mounted upon a pivot arm 81 of a toggle link 80 by means of a downwardly directed stud 74 secured by any suitable means to said pivot portion, such as by riveting as at 74a. The toggle link 80 is pivotally mounted upon a vertically disposed post 82 mounted upon the subplate 20 at 82a.

The post 82 is mounted upon the subplate 20 adjacent the outer arcuate edge 40a of the shift lever 40, and a central cylindrical body portion 83 of the toggle link 80 projects over said shift lever at said arcuate edge. The lowermost end of the body portion 83 is provided with a pair of downwardly extending tapered teeth 88—88, whereby the lower surface thereof provides a relatively small frictional contacting surface with the shift lever 40. Adjacent the upper end of the post 82 is a radially outwardly projecting snap ring 84, and between said snap ring and the body portion 83 of the toggle link 80 there is positioned a tensioned coil spring 87 whereby said toggle link is resiliently biased in a downward direction.

By referring to one of the top plan views of my phonograph turntable driving mechanism, such as Fig. 1, it will be noted that the toggle link 80 has two right angularly directed arms radiating outwardly from the cylindrical body portion 83, the recited pivot arm 81 upon which the mounting lever 72 is pivotally mounted, and a toggle actuating arm 85. The subplate 20 is cut away at the edge 20a adjacent the pivotally mounted toggle link 80 whereby the toggle actuating arm 85 can project outwardly beyond said subplate. The toggle actuating arm 85 is provided at the outermost end thereof, with a vertically downwardly directed pin 86, said pin 86 extending downwardly below and outwardly beyond the subplate 20.

As shown in Fig. 1, the idler pulley 70 is resiliently biased into simultaneous frictional engagement with the inner peripheral surface of the depending flange 11 of the turntable 10 and the uppermost driving portion 34 of the rotor shaft 30 by means of a spring 75, said spring being fastened at one end to the mounting lever 72 at the aperture 72a and at the other end thereof to a vertically upwardly bent lug 29 of the subplate 20. In the form shown, the lug 29 is integrally formed with the subplate 20 and projects upwardly from the edge thereof opposite the edge 20a. The pivot arm 81 of the toggle link 80 is angularly disposed relative to the mounting lever 72 pivoted thereupon whereby said toggle link is biased in a counter-clockwise direction relative to the post 82 by said mounting lever and the spring 75.

Referring now to Fig. 10, it will be noted that when the shift lever 40 is pivoted in a counter-clockwise direction, the drive pulley 60 moves in an arcuate path relative to pivot flange 41 and the rotor shaft 30 whereby it approaches the idler pulley 70; and when said shift lever is so pivoted a sufficient distance, said drive pulley contacts the outer peripheral surface of said idler pulley. When the drive pulley 60 is moved into engagement with the idler pulley 70, said idler pulley does not contact the rotor shaft 30, the distance between said drive pulley and the depending flange 11 of the turntable 10 being insufficient to allow said idler pulley to pass therebetween.

As hereinbefore recited, the rotor shaft 30 is provided with two driving surfaces 33 and 34 of different diametric dimensions, said surfaces being disposed at different levels, and the drive pulley 60 is similarly provided with corresponding driving surfaces of different diametric dimensions 63 and 64. The shifting of the idler pulley 70 from the level of the upper driving portions 34 and 64 of the rotor shaft 30 and the drive pulley 60 respectively to the lower driving portions 33 and 63 of said rotor shaft and said drive pulley is effected by means of the cams 43 and 44 of the shift lever 40 in a manner to be herein later more fully described.

To facilitate the above recited vertical shifting movements as well as the horizontal pivotal movement of the shift lever 40 whereby the drive pulley 60 is brought into peripheral engagement with the idler pulley 70, it is desirable that said idler pulley be momentarily withdrawn from contact with the turntable flange 11 and any of the recited previously engaged pulley driving portions of either the rotor shaft or the drive pulley. The withdrawing motion of the idler pulley 70 is effected by means of a release lever 90 pivotally mounted beneath the subplate 20.

In the form shown, the release lever 90 is pivoted at one end thereof upon a downwardly directed stud 91 riveted or otherwise suitably secured at 91a, said stud projecting downwardly from the lower surface of a slightly downwardly depressed recess 20b of the subplate 20. Interposed between the subplate 20 and the release lever 90 is a spacer 92 by which said release lever is spaced downwardly from the lowermost surface of said subplate. The release lever 90 is preferably formed of flat sheet metal and is provided with a finger portion 93 which projects outwardly beyond the edge 20a of the subplate 20, the outermost end of said finger portion being adjacent the downwardly directed pin 86 of the toggle actuating arm 85. As is well shown in Fig. 2, the pin 86 extends downwardly below the horizontal plane of the release lever 90 and into the arcuate path of the finger portion 93 of the said release lever.

The release lever 90 is provided with a laterally directed wing portion 94 adjacent the pivoted end thereof, said wing portion providing mounting means for a vertically upwardly projecting detent pin 95, said detent pin projecting upwardly through an arcuate aperture 20c in the subplate 20 and the arcuate slot 47 of the shift lever 40. As shown in Fig. 1, the detent pin 95 is positioned in the notch 48a with the shift lever 40 being shown pivoted to an extreme clockwise position. When the shift lever 40 is pivoted by means of the handle 42 thereof in a counter-clockwise direction, the detent pin 95 is cammed radially outwardly from the direction of the pivot flange 41 by the camming surface 47a, as shown in Fig. 3, and the release lever 90 is thereby pivoted in a clockwise direction. When the release lever 90 is pivoted in a clockwise direction, the finger portion 93 of said release lever abuts the downwardly directed pin 86 of the toggle link actuating arm 85 thereby pivoting the toggle link 80 in a similar clockwise motion. As the toggle link 80 is thus pivoted, the pivot arm 81 of said toggle link moves the idler pulley 70 away from the turntable flange 11 and the rotor shaft 30 on the drive pulley 60.

Figure 7:
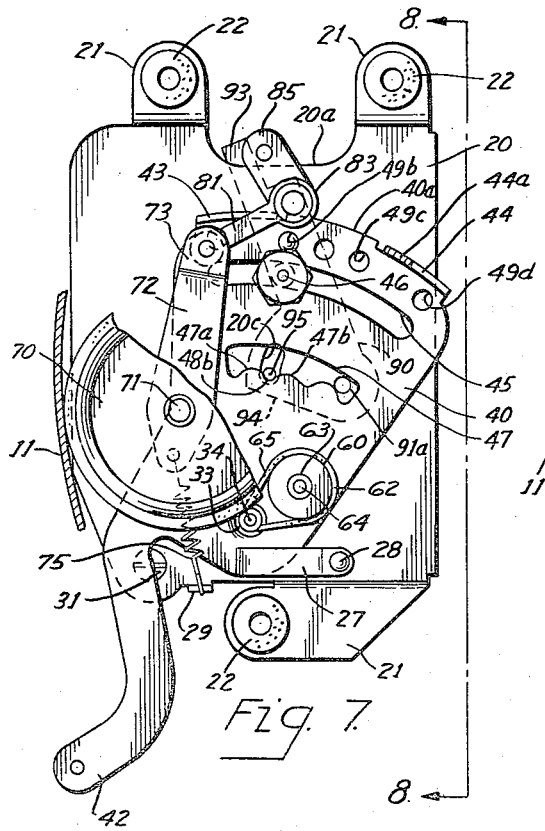
Fig. 7 is a top plan view of the turntable driving mechanism shown in an adjusted position for driving a turntable at 78 r.p.m.

When the shift lever 40 is further pivoted in a counter-clockwise direction, the detent pin 95 of the release lever 90 pivots into the notch 48b, as shown in Fig. 7, whereupon the finger portion 93 of the release lever 90 pivots in a counterclockwise direction away from the toggle actuating pin 85, and the idler pulley 70 is biased into frictional engagement with the turntable flange 11 and the rotor shaft 30 by the spring 75 of the mounting lever 72. In Figs. 10 and 12, I show the detent pin 95 positioned in the notches 48c and 48d respectively in which positions the idler pulley 70 is driven by the drive pulley 60.

It will be noted, therefore, that between each of the driving positions represented by the notches 48a, 48b, 48c and 48d, the idler pulley 70 is withdrawn from driving contact with the driving portions of the rotor shaft 30 or the drive pulley 60 and the turntable flange 11 by means of the camming surfaces 47a, 47b and 47c. It will be further noted that during the above recited camming movements and in response to the pivotal action of the shift lever 40, the radially outwardly disposed cams 43 and 44 and the arcuate edge 40a of said shift lever are being moved in an arcuate path beneath one of the downwardly extending teeth 88 of the body portion 83 of the toggle link 80, said tooth 88 being positioned upon the top surfaces of said cams when the shift lever is in an extreme clockwise or counterclockwise position, and said body portion being seated upon the relatively lower, uppermost surface of said shift lever at the arcuate edge 40a thereof when said shift lever is in an intermediate position.

Referring now to Fig. 5, the diametrically stepped pulley portions of the rotor shaft 30 and the drive pulley 60 are so proportioned as to drive the turntable 10 by means of the idler pulley 70 at different rotational speeds. In the form shown, the upper diametrically smaller driving portion 34 of the rotor shaft 30 drives the turntable 10 at a rotational speed of 45 r.p.m.; the lower and relatively larger driving portion 33 of said rotor shaft drives the turntable at 78 r.p.m.; the lower driving portion 63 of the drive pulley 60 drives the turntable at 33⅓ r.p.m. and the upper driving portion 64 of said drive pulley drives the turntable at 16⅔ r.p.m. The above recited sequence of speed changes, 45, 78, 33⅓ and 16⅔, corresponds with the notches 48a, 48b, 48c and 48d in the arcuate slot 47, and with the detent apertures 49a, 49b, 49c and 49d which are engaged by the detent ball 51.

When, therefore, the shift lever 40 is in the position, as shown in Fig. 1, the detent pin 95 of the release lever 90 is in the notch 48a of the arcuate slot 47, the detent ball 51 is frictionally engaged with the aperture 49a, and the toggle link 80 is in a raised position upon the cam 43 whereby the idler pulley 70 is engaged with the uppermost driving portion 34 of the rotor shaft 30. When the shift lever 40 is in the position, as shown in Fig. 7, the detent pin 95 engages the notch 48b, the detent ball 51 engages the aperture 49b, and the toggle link 80 is in a lowered position whereby the idler pulley 70 is engaged with the lower pulley driving portion 33 of the rotor shaft 30. In Figs. 10 and 12 the two succeeding speed shift positions 33⅓ r.p.m. and 16⅔ r.p.m. are shown wherein the detent pin 95 is successively engaged with the notches 48c and 48d, and the detent ball 51 is successively engaged with the apertures 49c and 49d. Between the speed shift positions 33⅓ r.p.m. and 16⅔ r.p.m. the toggle link 80 is cammed upwardly to a raised position by means of the inclined cam surface 44a of the cam 44 of the shift lever 40 and in such raised position, the idler pulley 70 is in contact with the uppermost pulley driving portion 64 of the drive pulley 60.

Figure 9:
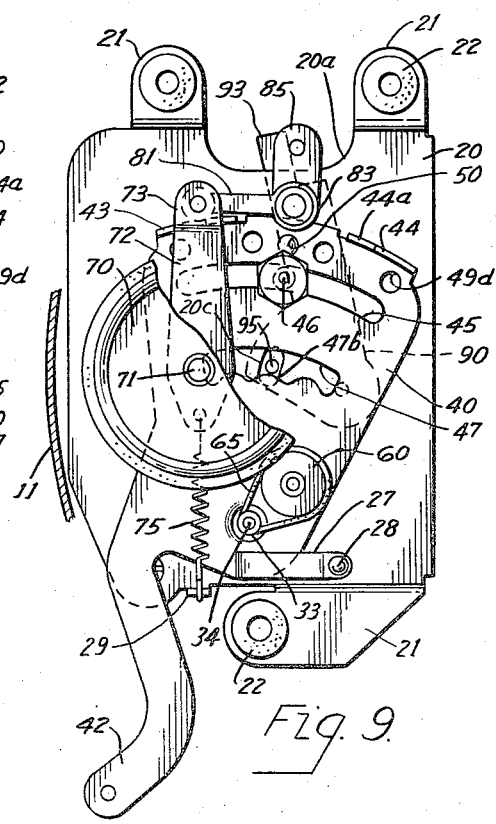
Fig. 9 is a top plan view of the turntable driving mechanism shown in an adjusted neutral position.
Figure 8:
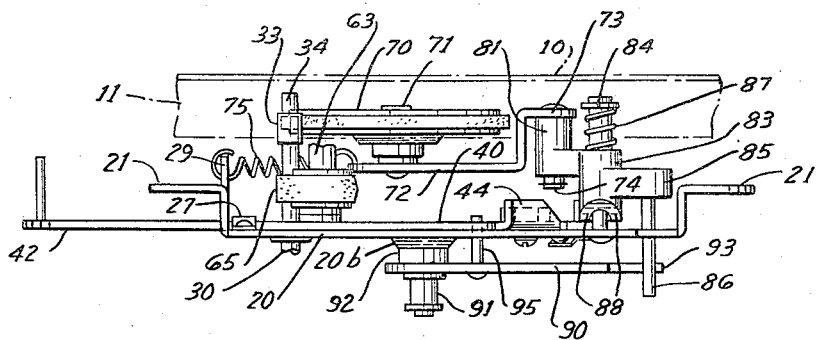
Fig. 8 is an elevational view taken along the line 8—8 of Fig. 7.

The aperture 50 in the shift lever 40 is positioned between the apertures 49b and 49c to provide a neutral or "off" position, as shown in Fig. 9. It will be understood, however, that the neutral position can be positioned between any two speed shift positions wherein the detent pin 95 of the release lever 90 is held in an outwardly cammed position by one of the cam surfaces 47a, 47b or 47c.

It will be understood that many departures from the details of my invention as it is herein described and illustrated may be made, such as changes in size and dimension, without, however, departing from the spirit of my invention or the scope of the appended claims.

What I claim is:

1. A plural-speed driving mechanism adapted for use with a phonograph turntable having a depending flange, said driving mechanism comprising a plurality of driving elements, each driving element having driving portions of different diameter, an idler wheel adapted to be interposed between said driving elements and said turntable flange, a support for said driving mechanism, a shift lever adapted to be pivotally mounted upon said support, one of said driving elements being associated with said shift lever and movable therewith, a pair of vertically and oppositely facing cam surfaces associated with said shift lever, cam follower means associated with said idler wheel, said cam follower means adapted to coact with said vertically facing cam surfaces whereby said idler wheel is vertically shiftable to contact said driving elements and at said portions of different diameter thereof, means whereby said idler wheel may be disengaged from contact with said driving elements and said turntable flange, said shift lever pivotally movable to a plurality of different predetermined positions whereby said idler wheel is adapted to frictionally transmit rotational movement to said turntable flange from different of said driving elements and portions of different diameter of said driving elements in a predetermined order of succession.

2. A multiple speed friction driving mechanism for rotating a phonograph turntable having a circumferentially continuous depending flange, said driving mechanism being mounted upon a plate disposed beneath said turntable and comprising a pair of driving elements, each of said driving elements having axially stepped pulley driving portions disposed at different levels, a first of said driving elements being movable in an arcuate path relative to said other driving element, a shift lever having vertically and laterally facing cam surfaces, a vertically and horizontally movable idler wheel rotatably mounted upon a mount, said mount pivoted upon said plate and having cam follower means associated therewith adapted to coact with said vertically facing cam surfaces for vertical movement of said mount, a release lever associated with said plate and having cam follower means adapted to coact with said laterally facing cam surfaces, means whereby said release lever is adapted to move said idler wheel in a horizontal plane, spring means biasing said idler wheel into frictional engagement with said turntable flange and one of said pulley driving portions, said shift lever being shiftable to a plurality of predetermined driving positions wherein said idler wheel is vertically adjusted to contact different of said pulley driving portions at different levels and wherein said first driving element is arcuately moved to engage said idler wheel alternately with said second driving element.

3. A multiple speed friction driving mechanism for rotating a phonograph turntable having a circumferentially continuous depending flange, said driving mechanism being mounted upon a plate disposed beneath said turntable, a motor driven rotor shaft projecting upwardly through said plate, a shift lever pivotally mounted upon said plate and having a drive pulley rotatably mounted thereupon, frictional driving means connecting said rotor shaft with said drive pulley whereby said drive pulley rotates at a different rotational speed than said rotor shaft, said rotor shaft and said drive pulley having upper and lower pulley driving portions of different diameters and disposed respectively at corresponding levels, said shift lever having vertically and laterally facing cam surfaces, an idler wheel rotatably mounted upon a vertically and horizontally movable mount, said mount pivoted upon said plate and having cam follower means associated therewith to coact with said vertically facing cam surfaces, a release lever mounted below said plate having cam follower means adapted to coact with said laterally facing cam surfaces, means associated with said mount whereby said release lever is adapted to move said idler wheel in a horizontal plane, spring means biasing said idler wheel into frictional engagement with said turntable flange and one of said pulley driving portions, said drive pulley movable with said shift lever whereby it can engage said idler wheel alternately with said rotor shaft, said shift lever being shiftable to a plurality of predetermined adjustment positions wherein said idler wheel is vertically cammed by said vertically facing cam surfaces to contact said upper and lower pulley driving portions in a predetermined order of succession, said release lever adapted to move said idler wheel to a disengaged position whereby it does not contact said turntable flange or any of said pulley driving portions when said shift lever is intermediate said predetermined adjustment positions.

4. A plural-speed turntable driving mechanism adapted to driving a turntable having a circumferentially continuous depending flange, said mechanism mounted upon a plate and comprising an idler wheel rotatably mounted upon a pivoted mount, said mount pivoted upon a toggle link, said toggle link pivoted upon said plate, a plurality of driving elements adapted to contact said idler wheel, a first of said driving elements projecting upwardly through said plate, a second of said driving elements mounted upon a pivoted shift lever and adapted to move into contact with said idler wheel alternately with the first of said driving elements, said shift lever having vertically and horizontally facing cam surfaces, each of said driving elements having upper and lower pulley driving portions, said toggle link having means coacting with said vertically facing cam surfaces whereby said idler wheel is vertically adjusted to contact said pulley driving portions of said driving elements at the different levels thereof upon pivotal movement of said shift lever, a release lever pivotally mounted upon the lowermost surface of said plate and having a horizontally projecting arm, said toggle link having a downwardly projecting pin adapted to contact said arm of said release lever, said release lever having cam follower means adapted to coact with said horizontally facing cam surfaces of said shift lever whereby pivotal movement of said shift lever effects pivotal movement of said release lever, the pivotal movement of said release lever effecting a pivotal movement of said toggle link, spring means biasing said idler wheel into simultaneous contact with said turntable flange and one of said driving elements, said shift lever movable to a plurality of predetermined positions wherein said idler wheel engages the pulley driving portions of the driving elements in a predetermined order of succession.

5. A turntable driving mechanism substantially as set forth in claim 3 wherein the said toggle link is pivoted by said release lever arm intermediate said adjusted positions effecting a withdrawal of said idler wheel from said turntable flange and any of said driving pulley portions.

6. A plural-speed driving mechanism adapted to rotate a turnable having a circumferentially continuous depending flange, said mechanism being mounted upon a plate and comprising a plurality of axially stepped driving elements, each of said driving elements having pulley driving portions disposed at different levels, a vertically and horizontally movable idler wheel resiliently biased into contact with said turntable flange, said driving elements adapted to contact said idler wheel, a first of said driving elements mounted upon a shift lever pivoted upon said plate and adapted to move said first driving element whereby it contacts said idler wheel alternately with a second of said driving elements, said shift lever having vertically and horizontally facing cam surfaces, said idler wheel rotatably mounted upon a mount, said mount pivoted upon a first bearing portion of a toggle link, said toggle link having a second bearing portion pivotally mounted upon said plate, said second bearing portion having means associated therewith to coact with said vertically facing cam surfaces of said shift lever whereby said idler wheel is disposed to contact different of said pulley driving portions at different levels thereof, said second bearing portion of said toggle link having a horizontally projecting toggle link arm extending beyond an edge of said plate, a release lever pivotally mounted to the lowermost surface of said plate and having a finger portion extending beyond an edge of said plate in the general direction of said toggle link arm, said release lever having cam follower means adapted to coact with said horizontally facing cam surfaces of said shift lever thereby effecting pivotal movement in said release lever, said toggle link arm having a downwardly projecting pin adapted to contact said finger portion of said release lever whereby pivotal movement of said release lever effects pivotal movement in said toggle link and whereby said idler wheel is withdrawn from contact with said turntable flange and any of said pulley driving portions, said shift lever being pivotally movable to a plurality of predetermined adjustment positions whereby said idler wheel is shifted to contact different of said pulley driving portions at the different levels thereof in a predetermined order of succession and whereby said idler wheel is withdrawn from contact with said turntable flange and any of said pulley driving portions intermediate said adjustment positions.

7. A multiple speed phonograph turntable driving mechanism adapted to drive a turntable having a circumferentially continuous depending flange, said driving mechanism mounted upon a plate disposed beneath said turntable, a rotor shaft projecting vertically upwardly through an aperture in said plate, an adjustment lever pivoted coaxially with said rotor shaft upon said plate and having a handle projecting outwardly from said turntable, a drive pulley rotatably mounted upon said adjustment lever adjacent said rotor shaft, a continuous belt frictionally connecting said rotor shaft and said drive pulley, an idler pulley rotatably mounted upon a pivoted mount, said mount pivotally mounted upon a first arm of a toggle link, said toggle link having a second arm angularly disposed relative to said first arm, spring means attached to said mount and biasing said idler pulley into simultaneous frictional engagement with the inner peripheral surface of said turntable flange and said rotor shaft in certain predetermined adjusted positions of said adjustment lever, said drive pulley arcuately movable by pivotal movement of said adjustment lever to other predetermined adjusted positions whereby said idler pulley engages said drive pulley and does not engage said rotor shaft, said adjustment lever having a radially outermost arcuate edge portion projecting beneath said toggle link, said arcuate edge portion having vertically disposed cams projecting upwardly from the ends thereof, said adjustment lever pivotal to extreme clockwise and counter-clockwise predetermined adjustment positions, whereby said toggle link is alternately vertically raised to an uppermost position by said vertically disposed cams, said toggle link being positioned in a lowermost position when said adjustment lever is in relatively medial predetermined adjustment positions, said rotor shaft and said drive pulley having upper and lower driving portions of different diameters, said idler pulley being in a horizontal plane with said upper driving portions when said toggle link is in a raised position, said idler pulley being in a horizontal plane with said lower driving portions when said toggle link is in a lowermost poistion, said adjustment lever having a plurality of laterally facing cam means associated therewith, said second arm of said toggle link having a downwardly directed pin, a release lever pivotally mounted to the lowermost surface of said plate and having one end thereof adapted to contact said downwardly directed pin, said release lever having means whereby it is adapted to be pivoted by said laterally facing cam means, said pivotal movement of said release lever effecting a pivotal movement in said toggle link whereby said idler pulley is moved out of contact with said turntable flange and any of said driving portions of said rotor shaft and said drive pulley when said adjustment lever is pivoted to a position which is intermediate any two of said predetermined adjusted positions.

8. A plural-speed driving mechanism adapted for use with a phonograph turntable having a depending flange, said driving mechanism comprising a plurality of driving elements, each driving element having driving portions of different diameter, an idler wheel adapted to be interposed between said driving elements and said turntable flange, a support for said driving mechanism, a shift lever adapted to be pivotally mounted upon said support, one of said driving elements being associated with said shift lever and movable therewith, a pair of vertically and oppositely facing cam surfaces associated with said shift lever, cam follower means associated with said idler wheel, said cam follower means adapted to coact with said vertically facing cam surfaces whereby said idler wheel is vertically shiftable to contact said driving elements and at said portion of different diameter thereof, said shift lever pivotally movable to a plurality of different predetermined positions whereby said idler wheel is adapted to frictionally transmit rotational movement to said turntable flange from different of said driving elements and portions of different diameter of said driving elements in a predetermined order of succession.

References Cited in the file of this patent

UNITED STATES PATENTS

| | | |
|---|---|---|
| 2,438,265 | Metzner | Mar. 23, 1948 |
| 2,612,053 | Capell | Sept. 30, 1952 |
| 2,704,461 | Jahncke | Mar. 22, 1955 |
| 2,746,306 | Hartman | May 22, 1956 |
| 2,788,669 | Richards | Apr. 16, 1957 |
| 2,818,741 | Siebert | Jan. 7, 1958 |

UNITED STATES PATENT OFFICE

CERTIFICATE OF CORRECTION

Patent No. 2,925,737                         February 23, 1960

Herbert L. Hartman

It is hereby certified that error appears in the printed specification of the above numbered patent requiring correction and that the said Letters Patent should read as corrected below.

Column 9, line 13, for the claim reference numeral "3" read -- 4 --.

Signed and sealed this 9th day of August 1960.

(SEAL)
Attest:

KARL H. AXLINE
Attesting Officer

ROBERT C. WATSON
Commissioner of Patents